United States Patent Office 3,496,167
Patented Feb. 17, 1970

3,496,167
ESTRATRIENE 3-(1-PHENYL-1H-TETRAZOL-5-YL) ETHERS
Duane F. Morrow, Ann Arbor, Mich., assignor to Parke, Davis & Company, Detroit, Mich., a corporation of Michigan
No Drawing. Filed Apr. 3, 1968, Ser. No. 718,332
Int. Cl. C07c *173/10, 167/30;* A61k *17/06*
U.S. Cl. 260—239.5                    4 Claims

ABSTRACT OF THE DISCLOSURE

A series of estratriene 3-(1-phenyl-1H-tetrazol-5-yl) ethers including 3-[(1-phenyl-1H-tetrazol - 5 - yl)oxyl]-estra-1,3,5(10)-trien-17β-ol; the corresponding α-methyl, ethyl, and ethynyl compounds; esters of the 17β-ol group; and the corresponding 17-one. The products have pharmacological activities and can be produced by (a) reacting a 3-hydroxyestratriene with a 5-halo-1-phenyltetrazole in the presence of a base, or (b) reacting a 17β-ol compound with an esterifying agent.

---

The present invention relates to new steroid compounds. More particularly, it relates to new estratriene 3-(1-phenyl-1H-tetrazol-5-yl) ethers and to methods for their production.

The compounds of the invention can be represented by the formula

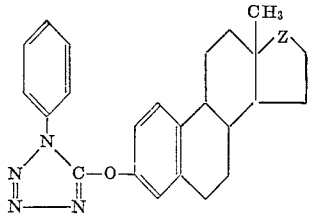

In this formula Z represents

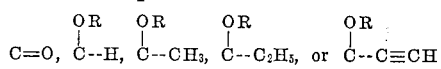

where R represents hydrogen or lower alkanoyl. A dotted single bond, as used herein, indicates a substituent having the α-configuration. When R represents lower alkanoyl, it is preferably an alkanoyl radical having no more than 4 carbon atoms.

In accordance with the invention, the foregoing compounds can be produced by reacting an estratriene compound of the formula

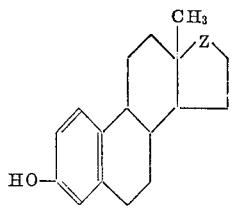

with a 5-halo-1-phenyltetrazole of the formula

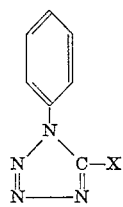

in the presence of a base; where Z is as defined before and X represents halogen, specifically chlorine, bromine, or iodine. Either an organic or inorganic base can be used. Some examples of suitable bases are alkali metal carbonates such as sodium carbonate and potassium carbonate; alkaline earth metal carbonates such as calcium carbonate and barium carbonate; and tertiary amines such as triethylamine, pyridine, and N,N-dimethylaniline. A preferred base is potassium carbonate. Some examples of solvents suitable for use in the reaction are ketones such as acetone, methyl ethyl ketone, and diethyl ketone; ethers such as dioxane, tetrahydrofuran, diethyl ether, and diethylene glycol dimethyl ether; tertiary amides such as N,N-dimethylformamide and N-methyl-2-pyrrolidinone; acetonitrile; and dimethyl sulfoxide. A preferred solvent is acetone. The estratriene compound, the 5-halo-1-phenyltetrazole, and the base can be used in equimolar amounts, or a moderate excess of one or more of these materials can be used. It is preferable to use an excess of the base. The time and temperature of the reaction can be varied within relatively wide limits. In general, the reaction is carried out at a temperature between about 10° C. and the reflux temperature of the solvent for a period of from about 1 to 48 hours. Using acetone as a solvent at the reflux temperature, a reaction time of about 12 to 24 hours is preferred.

Also in accordance with the invention, the esters of the invention, that is the compounds of the formula

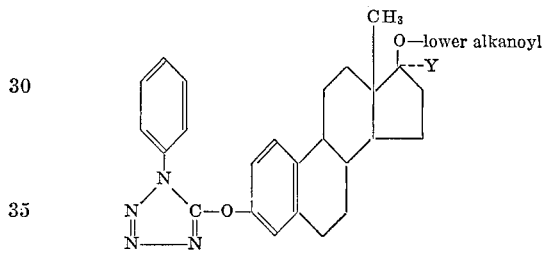

can be produced by reacting a compound of the formula

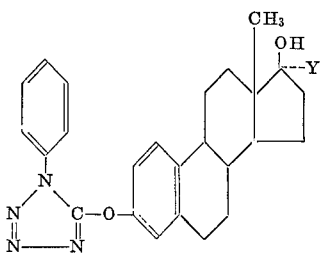

with a lower alkanoic acid or a reactive derivative thereof; where Y represents hydrogen, methyl (—CH₃), ethyl (—C₂H₅), or ethynyl (—C≡CH). Some examples of suitable reactive derivatives of lower alkanoic acids are the acid halides and acid anhydrides. Optionally, the reaction is carried out in the presence of a basic catalyst or agent such as triethylamine or pyridine; or an acidic catalyst or agent such as p-toluenesulfonic acid. The preferred reactive derivative is an acid anhydride either with or without a basic catalyst. In such cases an excess of the acid anhydride can be used as solvent. Some examples of other solvents which can be used are tertiary amines such as triethylamine and pyridine, which also serve as catalysts; ethers such as diethyl ether, dioxane, and tetrahydrofuran; hydrocarbons such as benzene and toluene; and halogenated hydrocarbons such as chloroform and carbon tetrachloride. At least one equivalent and preferably an excess of the lower alkanoic acid or its reactive derivative are used in the reaction. The time and temperature of the reaction are not critical. In general, the reaction is carried out at a temperature between about 0 and 175° C. or the reflux temperature of the solvent for a period of from about 30 minutes to 24 hours.

3

When using an acid anhydride without a base, the preferred reaction conditions are 120 to 160° C. for 30 minutes to 2 hours. When using an acid anhydride in the presence of a base, the preferred reaction conditions are 15 to 35° C. for 12 to 20 hours when Y represents hydrogen; or 90 to 100° C. for 24 hours when Y represents methyl, ethyl, or ethynyl. Within the indicated temperature range, relatively high temperatures are used when the reactant is a lower alkanoic acid and relatively low temperatures are used when the reactant is a lower alkanoic acid halide or anhydride in the presence of a base.

The compounds of the invention are useful pharmacological agents having estrogenic and antifertility activities. They cause a sustained estrogenic response following a single oral dose and their quantitative activity in this respect can be measured by the following test procedure. Female rats are ovariectomized at 21 days of age and allowed a rest period of one week. At 28 days of age they are given a single oral dose, by gavage, of 5.0 mg. of test compound in 0.5 ml. of an aqueous vehicle. Controls are dosed with the vehicle only. Control and test rats are sacrificed in groups of five at 7-day intervals, ending at 28 days. The average absolute increase over controls in uterine weight in milligrams is determined and is a measure of sustained estrogenic effect. In this test procedure a single oral dose of one of the compounds of the invention produces a sustained estrogenic effect for at least 7 days and in most cases for at least 28 days. For the purpose of producing a sustained estrogenic effect, the preferred compounds of the invention are those in which the group Z contains a hydroxy function, and esters thereof. The antifertility activity of the compounds of the invention can be measured by testing their effectiveness in preventing pregnancies in mice. The compounds are administered orally by incorporation in the diet at such a concentration that each mouse will receive the preselected daily dosage. The assay procedure is begun by dividing female mice into treatment groups and untreated control groups with four mice housed in each cage. Two days after administration of the drug has begun, a fertile male is introduced into each cage and left there 12 days. A majority of the untreated control group produces litters. If no litters are born to any of the females in a treatment group, the compound is rated active at that dose level. In this test procedure 3-[(1-phenyl - 1H - tetrazol-5-yl)oxy] - 19 - nor-17α-pregna-1,3,5(10)-triene-20-yn-17-ol and its acetate ester are rated active at 0.05 mg./kg./day.

The invention is illustrated by the following examples.

EXAMPLE 1

A suspension of 6.0 g. of estrone, 4.0 g. of 5-chloro-1-phenyltetrazole, and 6.0 g. of potassium carbonate in 250 ml. of anhydrous acetone is stirred and heated at reflux for 20 hours. The mixture is concentrated to a small volume under reduced pressure and diluted with water. The resulting precipitate of 3-[(1-phenyl-1H-tetrazol-5-yl)oxy]estra-1,3,5(10)-trien-17-one is collected by filtration, washed with water, and dried; M.P. 200–201° C. following crystallization from methanol.

By substituting an equivalent amount of 5-bromo-1-phenyltetrazole or 5-iodo-1-phenyltetrazole for the 5-chloro-1-phenyltetrazole in the foregoing procedure, the same product is obtained.

EXAMPLE 2

From 6.0 g. of 17β-estradiol, 4.0 g. of 5-chloro-1-phenyltetrazole, and 6.0 g. of potassium carbonate in 250 ml. of acetone, following the procedure of Example 1, there is obtained 3-[(1-phenyl-1H-tetrazol-5-yl)oxy]-estra-1,3,5(10)-trien-17β-ol; M.P. 189–190.5° C. following crystallization from methanol.

4

By substituting an equivalent amount of triethylamine or pyridine for the potassium carbonate in the foregoing procedure, the same product is obtained.

EXAMPLE 3

From 1.59 g. of 17α-methylestradiol, 1.1 g. of 5-chloro-1-phenyltetrazole, and 1.6 g. of potassium carbonate in 75 ml. of acetone, using the general procedure of Example 1 with a reflux period of 16 hours, the product obtained is 17-methyl-3-[(1-phenyl-1H-tetrazol-5-yl)-oxy]estra-1,3,5(10)-trien-17β-ol; M.P. 138–139° C. following crystallization from methanol.

By following this same procedure but with the substitution of an equivalent amount of 17α-ethylestra-diol for the 17α-methylestradiol, the product obtained is 17-ethyl-3-[(1-phenyl-1H-tetrazol-5-yl)oxy]estra - 1,3,5(10)-trien-17β-ol.

From 1.0 g. of 17α-ethynylestradiol, 0.65 g. of 5-chloro-1-phenyltetrazole, and 1.0 g. of potassium carbonate in 50 ml. of acetone, using the general procedure of Example 1 with a reflux period of 18 hours, the product obtained is 3-[(1-phenyl-1H-tetrazol-5-yl)oxy]-19-nor-17α-pregna-1,3,5(10)-trien-20-yn - 17 - ol; M.P. 157–159° C. following crystallization from methanol.

EXAMPLE 5

A solution of 0.71 g. of 3-[(1-phenyl-1H-tetrazol-5-yl)oxy]estra-1,3,5(10)-trien-17β-ol in 20 ml. of pyridine and 20 ml. of acetic anhydride is allowed to stand at 20–25° C. for 16 hours and then poured into excess dilute hydrochloric acid. The precipitate of 3-[(1-phenyl-1H-tetrazol-5-yl)oxy]estra-1,3,5(10)-trien-17β-ol, acetate ester which separates, is collected by filtration, washed with water, and dried; M.P. 146.5–148° C. following crystallization from methanol.

By substituting an equivalent amount of propionic anhydride for the acetic anhydride in the foregoing procedure, the corresponding propionate ester is obtained.

EXAMPLE 6

A solution of 0.22 g. of 3-[(1-phenyl-1H-tetrazol-5-yl)oxy]-19-nor-17α-pregna-1,3,5(10)-trien-20 - yn - 17-ol in 10 ml. of acetic anhydride is heated at reflux for 1 hour and then cooled and stirred with 10 ml. of methanol. The resulting solution is evaporated to dryness at reduced pressure to give a residue of 3-[(1-phenyl-1H-tetrazol-5-yl)oxy]-19-nor-17α-pregna-1,3,5(10)-trien-20 - yn - 17-ol, acetate ester; M.P. 149–151° C. following crystallization from hexane.

What is claimed is:
1. A compound of the formula

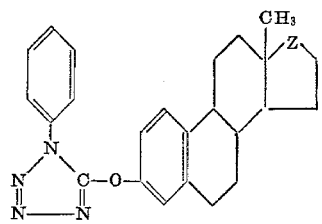

where Z is a member of the class consisting of

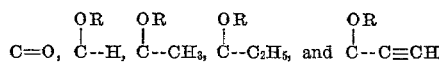

and R is a member of the class consisting of hydrogen and lower alkanoyl.

2. A compound according to claim 1 which is 3-[(1-phenyl-1H-tetrazol - 5 - yl)oxy] - 19 - nor - 17α - pregna-1,3,5(10)-trien-20-yn-17-ol.

3. A compound according to claim 1 which is 3-[(1-phenyl-1H-tetrazol - 5 - yl)oxy] - 19 - nor - 17α - pregna-1,3,5(10)-trien-20-yn-17-ol, acetate ester.

4. A compound according to claim 1 which is 17-methyl-3-[(1-phenyl-1H-tetrazol-5 - yl)oxy]estra - 1,3,5(10)-trien-17β-ol.

References Cited

UNITED STATES PATENTS

| | | | |
|---|---|---|---|
| 3,212,971 | 10/1965 | Allais et al. | 167—65 |
| 3,265,718 | 8/1966 | Christiansen | 260—397.5 |
| 3,383,394 | 5/1968 | Weber et al. | 260—397.45 |
| 3,409,643 | 11/1968 | Shapiro | 260—397.5 |

LEWIS GOTTS, Primary Examiner

ETHEL G. LOVE, Assistant Examiner

U.S. Cl. X.R.

424—241